May 6, 1952  V. E. PALUMBO  2,595,482
BEARING

Filed April 13, 1949  3 Sheets-Sheet 1

INVENTOR.
VINCENT E. PALUMBO
BY
West & Oldham
ATTORNEYS

May 6, 1952  V. E. PALUMBO  2,595,482
BEARING
Filed April 13, 1949  3 Sheets-Sheet 2

INVENTOR.
VINCENT E. PALUMBO
BY
West + Oldham
ATTORNEYS

May 6, 1952  V. E. PALUMBO  2,595,482
BEARING

Filed April 13, 1949  3 Sheets-Sheet 3

INVENTOR.
VINCENT E. PALUMBO
BY
West Oldham
ATTORNEYS

Patented May 6, 1952

2,595,482

UNITED STATES PATENT OFFICE 2,595,482

BEARING

Vincent E. Palumbo, Cleveland Heights, Ohio

Application April 13, 1949, Serial No. 87,221

21 Claims. (Cl. 308—6)

This invention is a novel type of bearing which, in certain of its forms, resembles ball bearings of conventional kinds, but differs therefrom in principle. The unique principle of my improved bearing is applicable to certain designs of roller bearings as well as to bearings wherein the rolling contact members consist of balls, and with respect to the latter—that is, the forms in which balls are used—the invention may be described broadly as a ball bearing that operates on the principle of a journaled roller bearing.

The chief object of my invention is to provide a bearing of wide application, that is simple and relatively inexpensive of production, is highly efficient, strong and convenient of installation.

A further object of the invention is to provide a bearing that operates on a principle which adapts it to the support and guidance of a reciprocating object; to the support of a rotating shaft; to the obvious use as a follower for cooperation with a cam, etc.

Another and more limited object is the production of a bearing similar to an annular ball bearing, but which is split radially or diametrically for application to a shaft or the like in a radial direction.

A still further object of the invention is the provision of a bearing that, by simple adjustment, is convertible from one to the other of a bearing for the support of a rotating shaft, and a bearing for the support and guidance of a reciprocating shaft or rod.

It is also a purpose of my invention to provide a bearing comprising a plurality of rolling contacting members for engagement with the object that is to be movably supported and which is adjustable to regulate the pressure of the rolling contact members upon the object.

With the above and other objects in view, my invention resides in the novel features of form, construction, arrangement and combination of parts presently described and pointed out in the claims.

Figure 1:
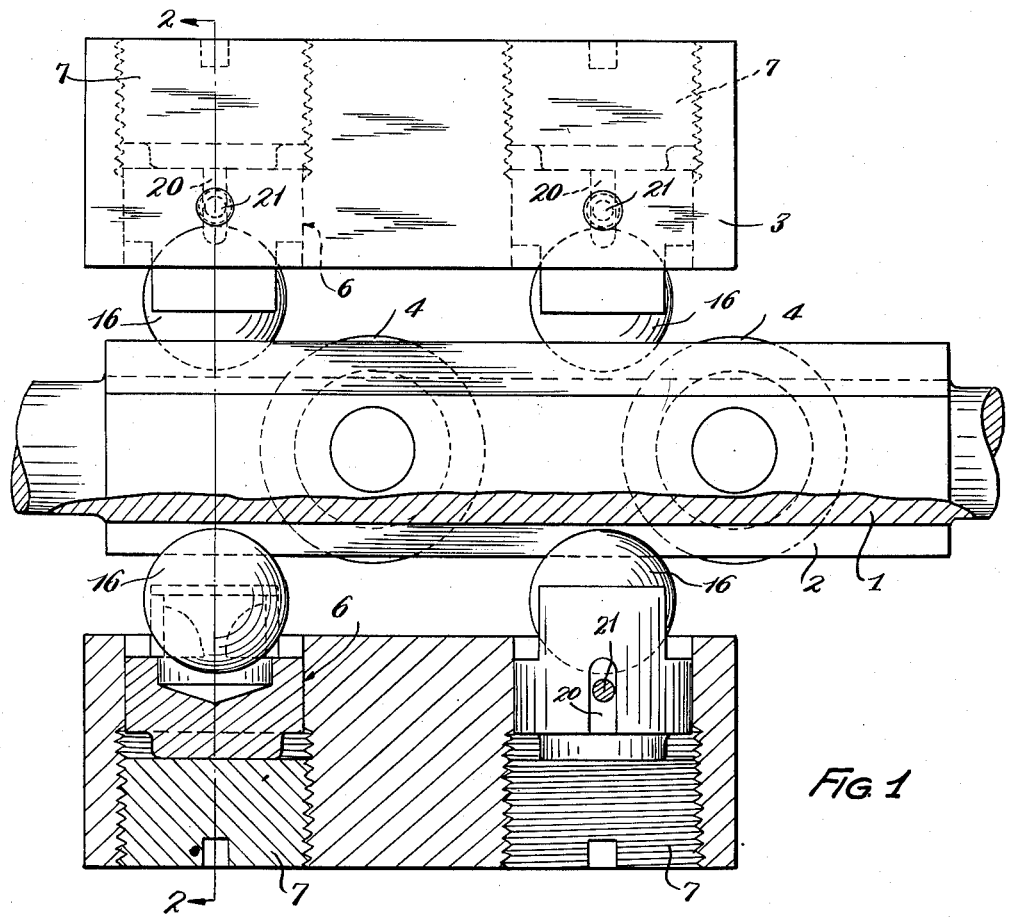
Figure 2:
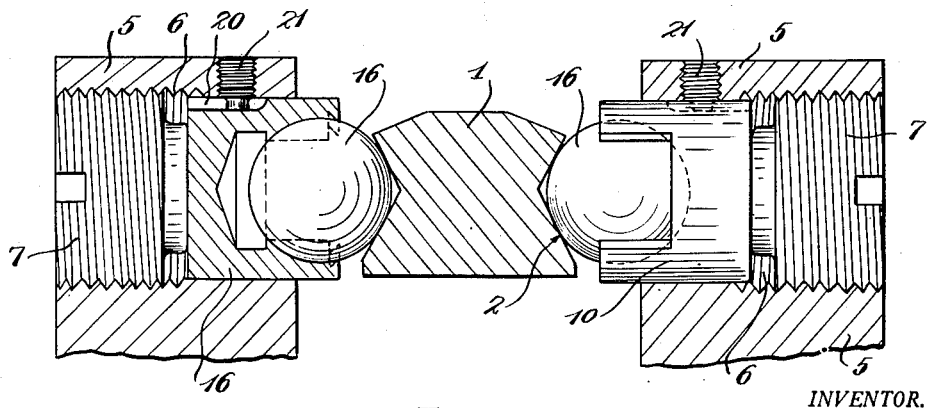
Figure 4:
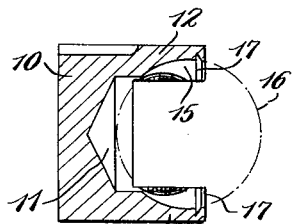
Figure 3:
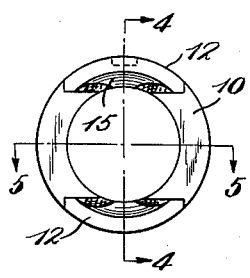
Figures 6, 7:
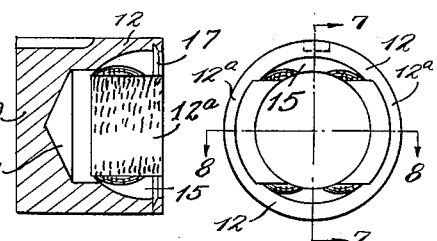
Figure 5:
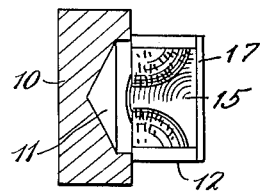
Figure 8:
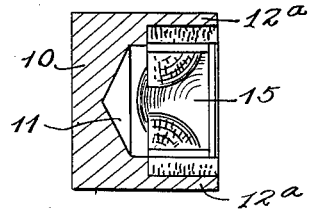
Figure 9:
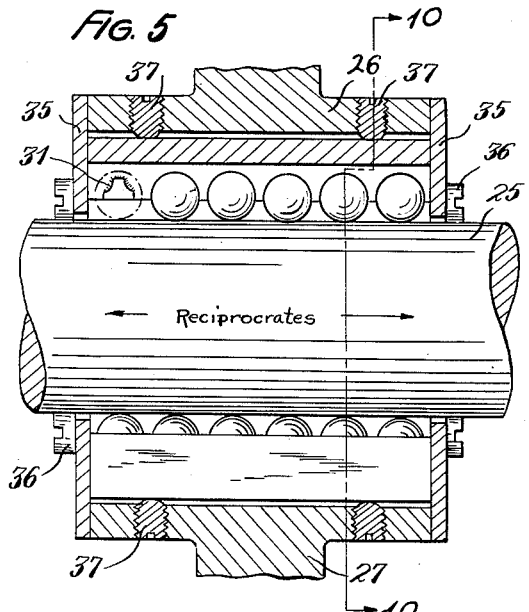
Figure 10:
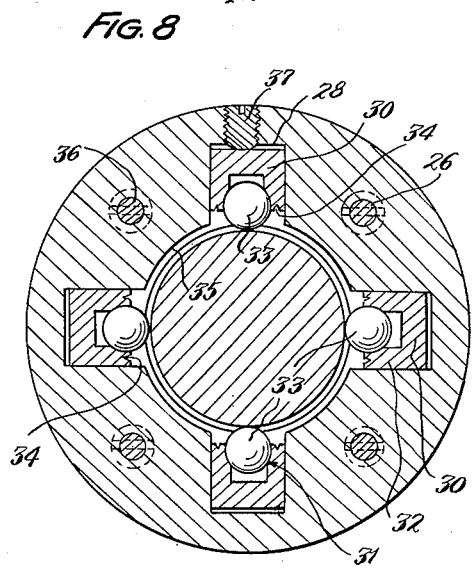
Figure 11:
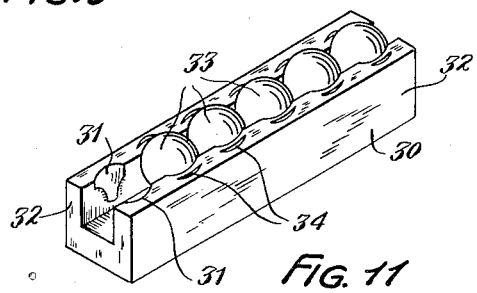
Figure 13:
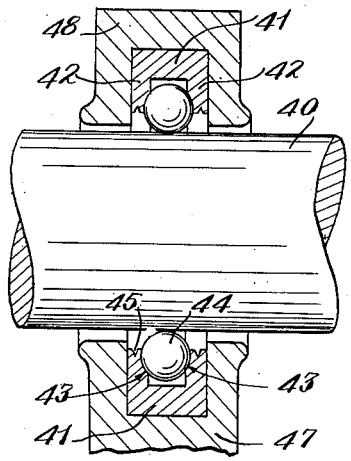
Figure 12:
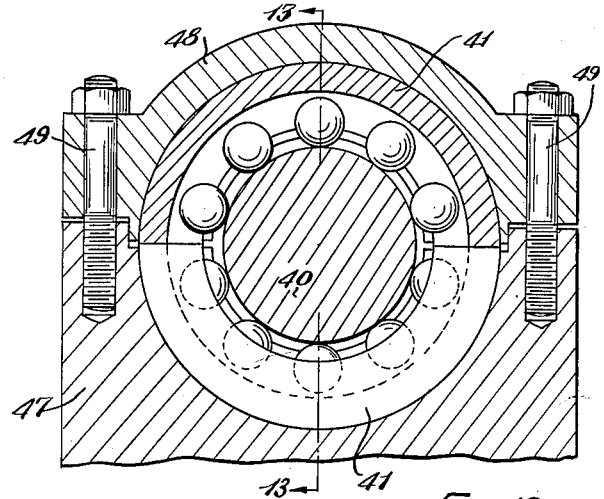
Figure 14:
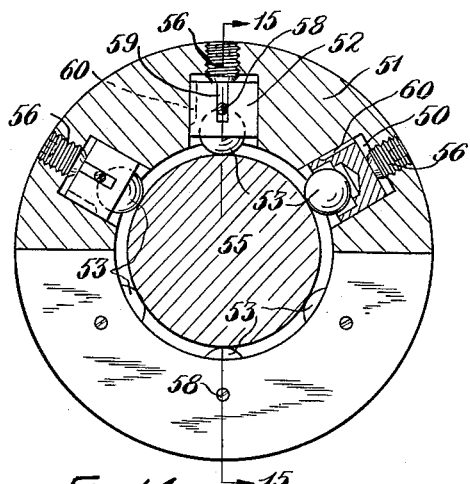
Figure 15:
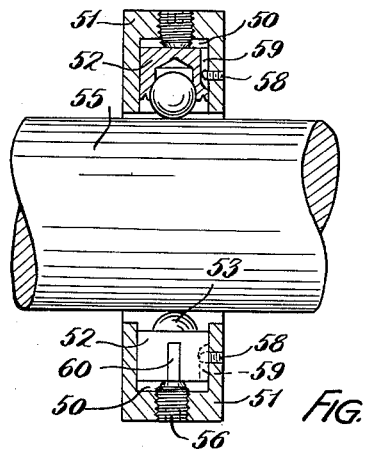
Figure 16:
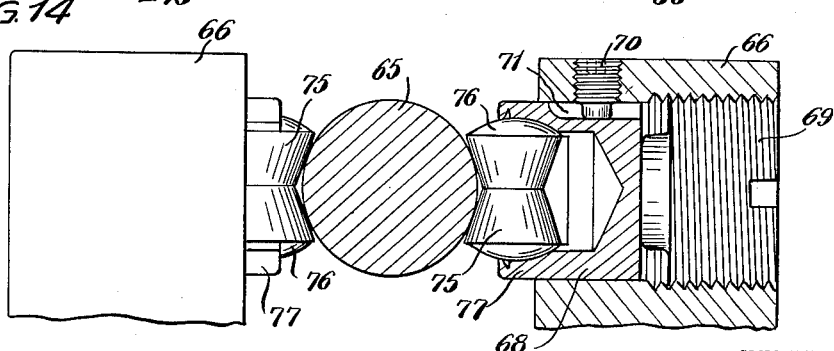

In the accompanying drawings, Fig. 1 is a somewhat diagrammatic plan view of apparatus involving a reciprocating object that is supported and guided by bearings of my invention; Fig. 2 represents a section on the line 2—2 of Fig. 1; Fig. 3 is a front view of a bearing receptacle incorporated in the form of the invention illustrated in the preceding views; Figs. 4 and 5 are sections on the respective lines 4—4 and 5—5 of Fig. 3; Fig. 6 is a front view of a receptacle that is intended particularly for heavy duty; Figs. 7 and 8 are sections on the respective lines 7—7 and 8—8 of Fig. 6; Fig. 9 is a central section through a structure for the support and guidance of a reciprocating rod or shaft and which incorporates a modified form of the bearing; Fig. 10 is a transverse section on the line 10—10 of Fig. 9; Fig. 11 is a perspective view of one of the bearings employed in the structure illustrated in Figs. 9 and 10, one of the contact members or balls being omitted for the purpose of better disclosing a bearing surface of the receptacle; Figs. 12 and 13 are sectional views at right angles to each other through a split annular bearing incorporating the invention showing it contained in a pedestal or pillow block, Fig. 13 being a section on the correspondingly numbered line of Fig. 12; Fig. 14 is a side elevational view, partly in section, of an embodiment of the invention that is convertible from one to the other of a bearing for the support of a rotating shaft, and one for the support and guidance of a reciprocating shaft or rod; Fig. 15 is a section on the line 15—15 of Fig. 14, and Fig. 16 shows the invention embodied in roller bearings for the support and guidance of a reciprocating object.

Referring to the drawings more in detail and by reference characters, I shall now describe the several embodiments and modifications in the order in which they appear in the consecutive views.

The apparatus that is more or less schematically illustrated in Figs. 1 and 2 comprises a reciprocating object or cross head 1 having grooves or guideways 2 that extend along its opposite sides, the same being shown as V-shaped in cross section. For the purpose of illustration I have chosen the cross head of an engine or like apparatus shown in my copending application Serial No. 84,201 filed March 29, 1949, now Patent No. 2,567,576. The subject matter of said application is a cam action and the cross head carries followers or rollers, such as those designated 4 in Fig. 1 of the drawings herein.

On opposite sides of the course of movement of the object or cross head 1 are housings 5, having transverse bores or sockets 6 in the plane of the guideways 2. The front end of each bore, being that end nearest the object or cross head 1, is smooth, while the rear end is threaded for the reception of an adjusting screw 7. Occupying the front end of each bore 6 is a bearing receptacle 10 that is held against rearward movement by the corresponding screw 7. The receptacle, shown in detail in Figs. 3 to 5, has an axial recess 11 that opens through the forward end of the receptacle, and the peripheral wall of the receptacle is cut away on opposite sides to provide diametrically opposed bearing parts 12, in the form of segmental lugs. The inner sides of the parts 12 are formed with cavities 15, characterized by spherical bearing surfaces wherewith are adapted to engage journal areas of a rolling contact member or ball 16. The journal areas of the rolling contact member, whether the latter be a ball, or a roller of such form as that disclosed in Fig. 16, are confined to what may be termed the "pole regions" of the member; and said areas are of segmental spherical shape, and related as though described from a common center. When the contact member or ball 16 is properly seated in the receptacle, its rotating axis is spaced inwardly a suitable distance from the front ends of the bearing parts 12. The inner surfaces of said parts, forwardly of their contact with the journal areas of the member or ball, are tangent to said areas so that the member may be readily inserted. Adjacent to and parallel with their front ends, the parts 12 are transversely grooved on their inner sides to provide lips 17 that are peened inwardly so as to space them apart a distance slightly less than the diameter of the member or ball, thereby to retain the latter within the receptacle.

As appears more clearly from Figs. 3 to 5, the spherical bearing surfaces of the parts 12 are reduced in area to less than the portion of the journal areas of the contact member or ball 16 that lie within the boundaries of the cavities 15, this being for the obvious purpose of reducing to a minimum the friction between the journal areas of the contact member or ball and the bearing surfaces of the parts 12 of the receptacle.

It is important that the receptacle 10 be so positioned that the rotating axis of the rolling contact member or ball is substantially perpendicular to the plane or planes of contact between such member or ball and the object wherewith it cooperates. In the application of the invention now under consideration (Figs. 1 and 2), the receptacles 10 are held in the above described position, as follows: The receptacles are provided with keyways 20 into which project the reduced inner ends of screws 21 that are threaded through parts of the housings 5 that constitute the top walls of the bores 6. It may also be explained that, by adjusting the screws 7, the rolling contact members or balls 16 may be caused to bear with the desired pressure against the object or cross head 1.

I have said that the rotating axes of the contact members should be substantially perpendicular to the plane or planes of rolling contact between said members and the object whereon they track. A slight deviation from this arrangement in cases where the contact members are balls may be advantageous in that it would cause the balls to gradually shift their position with respect to the receptacle and thus distribute wear more evenly throughout the surfaces of the balls.

For heavy duty, as in cases where extreme load is to be imposed upon the bearing, the receptacle may be made as illustrated in Figs. 6 to 8. The essential difference between this receptacle and the one illustrated in Figs. 3 to 5 is that the side walls 12ª extend to the front end of the receptacle and connect the bearing parts 12, thereby preventing possible spreading of the latter. In all other respects the two receptacles are the same, for which reason the corresponding parts of the two are designated by the same reference characters. The first described form is preferred, principally because it is easier and therefore cheaper to produce, the second described form requiring the more difficult operation of removing material from the inner sides of the walls 12ª so as to provide clearance between said walls and the contact member or ball, as compared with the cross-cut operation of notching the peripheral wall of the receptacle between the parts 12, as in the first form.

Figs. 9, 10 and 11 show a modification of the invention for use in supporting a reciprocating object. Such object herein disclosed as a cylindrical rod or shaft, is designated 25, and it is supported, by means of a plurality of the bearings, centrally of a hollow boss 26, shown as an integral part of a supporting structure or housing 27. The bore of the boss 26 is somewhat greater in diameter than the rod or shaft 25, and parallel sided grooves 28 extend lengthwise through the boss and open into the bore thereof.

Occupying each groove 26 is a channel-like receptacle 30 of a bearing. Pairs of opposed concentric spherical cavities 31 are formed at spaced intervals along the inner sides of the flanges 32 of the receptacle for the reception of the spherical rolling contact members or balls 33, one ball being omitted from the receptacle in Figs. 9 and 11 to better reveal the shape of a cavity 31. As in the case of the previously described receptacles, the opposed cavities 31 are of sufficient depth to dispose the rotating axis of the contact member or ball inwardly of the front plane of the receptacle, and between such plane and said axis, the surface of each cavity is tangent to the adjacent surface of the member or ball. This permits the members or balls to be conveniently placed in the receptacle with their journal areas contacting the bearing surfaces of the receptacle, and after the members or balls are so emplaced, the material of the side flanges 32, in proximity to the cavities 31, is peened inwardly sufficiently to prevent accidental dislodgment of the contact members or balls from the receptacle. The depressions formed by a suitable tool in the front faces of the flanges 32 in the peening operation are designated 34.

The receptacles 30 are shown as held against endwise movement within the grooves of the boss 26 by end plates 35 that are held to the ends of the boss by screws 36. Occupying radial, threaded apertures of the boss that open into the grooves 28 near the opposite ends thereof are screws 37 by means of which the pressure of the contact members upon the rod or shaft 25 may be regulated.

Another adaptation of the bearing incorporating a channel form receptacle is illustrated in Figs. 12 and 13. In this instance the bearing supports a rotating shaft designated 40. This is the form of the invention in which the bearing resembles an annular ball bearing but is split diametrically, for example, for convenient application in a lateral or radial direction to the shaft. The bearing comprises two semi-cylindrical receptacles 41 that are in the form of channels and, except for their curvature, are identical with the receptacles 30 of the previously described modifications. The side flanges 42 of the receptacles have pairs of opposed cavities 43 that receive the rolling contact members or balls 44, the latter being held within the receptacles by peened portions resulting from forming depressions 45 in the outer faces of the flanges 42. The bearing occupies an annular groove in a supporting structure or housing 47 which is illustrated as a pillow block or pedestal and includes a cap 48 that is held in place by studs 49.

In Figs. 14 and 15 I have shown a form of the invention that is convertible from one to another of a bearing for supporting a rotating shaft, and a bearing for supporting and guiding a reciprocating rod or shaft. The present views illustrate the bearing adjusted for the support of a rotating shaft, and omit the supporting structure or housing which, for example, might be the same as that illustrated in Figs. 12 and 13. Within inwardly opening radial sockets 50 of semicylindrical casings 51 are bearing receptacles 52, incidentally of the form shown in Figs. 6 to 8. Occupying each receptacle 52 is a rolling contact member or ball 53 that is caused to engage the supported object 55 with the desired pressure by a proper adjustment of a screw 56 that is threaded through the outer wall of the corresponding socket 50 and bears against the adjacent end of the receptacle 52. The sockets and receptacles are shown as cylindrical, which shape is presently preferred, although they may be square, or of other appropriate shape in cross section, so long as it permits the receptacles to be adjusted angularly about the longitudinal axis of the socket a matter of 90°.

According to the arrangement shown, the rotating axes of the contact members or balls 53 are substantially parallel to the axis of the shaft 55. The bearings are held in this position by engagement of the inner ends of screws 58 in keyways 59 of the receptacles; and if the object 55 is to be supported for reciprocation, the receptacles are turned through 90° within the sockets of the casings 51 and are held in their newly adjusted position by the engagement of the screws 58 within keyways 60 of the receptacles. With the receptacles of the bearings adjusted as last described, the rotating axes of the contact members or balls 53 are substantially normal to the axis of the shaft 55.

As an example of an application of the form of the invention illustrated in Fig. 16 I have selected an apparatus somewhat similar to that illustrated in Figs. 1 and 2 and which includes an object 65 that is reciprocably supported by the bearings between opposed housings 66. The receptacles 68 are identical with those designated 10 in Figs. 1 and 2 and they occupy bores in the housings 66. The ends of the bores remote from the bearings are internally threaded for the reception of the screws 69; and the receptacles are held against turning within the bores by the engagement of the reduced inner ends of the screws 70 in keyways 71 of the receptacles, said screws occupying threaded apertures in the tops of the housings 66. The rolling contact members 75, in this instance, are in the form of rollers having shallow V-shaped circumferential grooves for the reception of the opposite sides of the cylindrical object 65, and their journal areas 76 engage the complementary bearing surfaces of the parts 77 of the receptacles 68.

Having thus described my invention, what I claim is:

1. A bearing comprising a rolling contact member including segmental spherical journal areas confined to the so-called pole regions of the member and described from a common center, said areas being concentric with the axis of rotation of said member, and a receptacle for said member having opposed parts provided with cavities that face each other and are characterized by bearing surfaces absolutely complementary to and which are engaged throughout by said journal areas, the contact member when thus positioned in the receptacle being positively held against any but rotary motion with respect to the receptacle, the aforesaid bearing surfaces extending inwardly of the receptacle from substantially the rotating axis of the contact member.

2. A bearing according to claim 1, wherein said bearing surfaces are less in area than the portions of the journal areas that lie within the boundaries of the cavities so as to minimize the extent of contact between said surfaces and said areas.

3. A bearing comprising a rolling contact member including segmental spherical journal areas confined to the so-called pole regions of the member and described from a common center, said areas being concentric with the axis of rotation of said member, a receptacle for said member having opposed parts provided with cavities that face each other and are characterized by bearing surfaces absolutely complementary to and which are engaged throughout by said journal areas, the contact member when thus positioned in the receptacle being positively held against any but rotary motion with respect to the receptacle, the aforesaid bearing surfaces extending inwardly of the receptacle from substantially the rotating axis of the contact member, and means on the receptacle outwardly of the rotating axis of the contact member for engagement with said member to prevent its dislodgment from the receptacle.

4. A bearing comprising a rolling contact member including segmental spherical journal areas confined to the so-called pole regions of the member and described from a common center, said areas being concentric with the axis of rotation of said member, and a receptacle for said member having opposed parts provided with cavities that face each other and are characterized by bearing surfaces absolutely complementary to and which are engaged throughout by said journal areas, the contact member when thus positioned in the receptacle being positively held against any but rotary motion with respect to the receptacle, the aforesaid bearing surfaces extending inwardly of the receptacle from substantially the rotating axis of the contact member, said opposed parts being grooved transversely on their inner sides adjacent their forward edges to provide lips that are projected inwardly for engagement with the contact member to prevent its dislodgement from the receptacle.

5. A bearing comprising a rolling contact member including segmental spherical journal areas confined to the so-called pole regions of the member and described from a common center, said areas being concentric with the axis of rotation of said member, and a receptacle having an axial recess that opens through the front end of the receptacle and provided with opposed parts adjacent said front end having cavities that face each other and are characterized by surfaces absolutely complementary to and which are engaged throughout by said journal areas, the contact member when thus positioned in the receptacle being positively held against any but rotary motion with respect to the receptacle, the aforesaid bearing surfaces extending inwardly of the said parts from substantially the rotating axis of the contact member.

6. A bearing comprising a rolling contact member including segmental spherical journal areas confined to the so-called pole regions of the member and described from a common center, said areas being concentric with the axis of rotation of said member, and a receptacle having an axial recess that opens through the front end of the receptacle and provided with opposed parts adjacent said front end which have cavities that face each other and are characterized by surfaces absolutely complementary to and which are engaged throughout by said journal areas, the contact member when thus positioned in the receptacle being positively held against any but rotary motion with respect to the receptacle, the aforesaid bearing surfaces extending inwardly of the said parts from substantially the rotating axis of the contact member, said opposed parts being grooved on their inner sides in a direction circumferentially of the contact member and forwardly of the rotating axis thereof to provide lips that are projected inwardly for engagement by the contact member to prevent its dislodgement from the receptacle.

7. The combination and arrangement of elements defined by claim 6, plus: a support having a socket for the reception of said receptacle, and means preventing rotation of the receptacle in said socket.

8. The combination and arrangement of elements defined by claim 6, plus: a support having a socket for the reception of said receptacle, and means for adjusting the receptacle axially of said socket.

9. The combination and arrangement of elements defined by claim 6, wherein said receptacle is cylindrical, plus: a support having a cylindrical socket in which the receptacle has a working fit, means for adjusting the receptacle axially of the socket, and further means for preventing rotation of the receptacle in the socket.

10. A bearing comprising a rolling contact member including segmental spherical journal areas confined to the so-called pole regions of the member and described from a common center, said areas being concentric with the axis of rotation of said member, and a receptacle having an axial recess that opens through the front end of the receptacle, the receptacle including diametrically opposed parts provided with cavities that face each other and open through the front ends of said parts and are characterized by bearing surfaces absolutely complementary to and which are engaged throughout by said journal areas when the contact member occupies the receptacle, the contact member when thus positioned in the receptacle being positively held against any but rotary motion with respect to the receptacle, the aforesaid bearing surfaces extending inwardly of the receptacle from substantially the rotating axis of the contact member, the receptacle including means forwardly of the rotating axis of the contact member for engagement with the latter to prevent its dislodgement from the receptacle.

11. A bearing according to claim 10, wherein the side walls of the receptacle are notched inwardly from their front ends between the aforesaid opposed parts.

12. A bearing according to claim 10, wherein the inner surfaces of the side walls of the receptacle for a considerable distance inwardly of their forward ends and between said opposed parts are offset outwardly to provide clearance for the contact member.

13. A bearing according to claim 10, wherein the receptacle is provided with a keyway on its outer side that extends longitudinally of the receptacle.

14. A bearing according to claim 10, wherein the receptacle is provided on its outer side with two keyways that extend longitudinally of the receptacle and are spaced apart circumferentially thereof substantially 90°.

15. In combination, a supporting part having an opening extending therethrough, an object reciprocable within said opening, the supporting part being provided with sockets that open into said opening, and receptacles occupying said sockets, said receptacles having opposed parts provided with cavities that face each other, and rolling contact members including segmental spherical journal areas confined to the so-called pole regions of the members and described from a common center and which areas are concentric with the axis of rotation of said members, the members being disposed partially within the receptacles with their journal areas occupying said cavities and their rotating axes perpendicular to the course of movement of said object, the cavities being characterized by bearing surfaces complementary to and which are engaged by said areas, the rolling contact members engaging and serving to support the aforesaid object for reciprocation.

16. In combination, a supporting part having an opening extending therethrough, an object rotatable within said opening, the supporting part being provided with sockets that open into said opening, and receptacles occupying said sockets, said receptacles having opposed parts provided with cavities that face each other, and rolling contact members including segmental spherical journal areas confined to the so-called pole regions of the members and described from a common center and which areas are concentric with the axis of rotation of said members, the members being disposed partially within the receptacles with their journal areas occupying said cavities and their rotating axes substantially parallel to the rotating axis of said objects, the cavities being characterized by bearing surfaces complementary to and which are engaged by said areas, the rolling contact members engaging an annular track extending about the aforesaid object and serving to support the object for rotation.

17. A bearing comprising a plurality of rolling contact members, each including segmental spherical journal areas confined to the so-called pole regions of the member and described from a common center, said areas being concentric with the axis of rotation of the member, and a receptacle in the form of a channel having pairs of opposed cavities formed in the inner faces of its side flanges and which open through the front face of said flanges, the cavities being characterized by bearing surfaces complementary to the journal areas of the contact members and engaged by said areas when the contact members occupy the receptacle.

18. A bearing as defined by claim 17, wherein the side flanges of the receptacle are deformed inwardly in proximity to the front ends of the cavities for engagement by the contact members to prevent dislodgement thereof from the receptacle.

19. A bearing comprising a plurality of rolling contact members, each including segmental spherical journal areas confined to the so-called pole regions of the member and described from a common center, said areas being concentric with the axis of rotation of the member, and an annular receptacle made up of segmental channels, each channel having pairs of opposed cavities formed in the inner faces of its side flanges and which open through the front faces of said flanges, the cavities being characterized by bearing surfaces complementary to the journal areas of the contact members and engaged by said areas when the contact members occupy the receptacle.

20. In combination, a casing having an opening, and a cylindrical object supported therein for reciprocatory movement or rotation; said casing having radial sockets that open into said opening, a receptacle within each socket, and a rolling contact member adapted to occupy each receptacle and bear against said object, said rolling contact member including segmental spherical journal areas confined to the so-called pole regions of the member and described from a common center, said areas being concentric with the axis of rotation of said member, and each receptacle having opposed parts provided with cavities that face each other and are characterized by bearing surfaces complementary to and which are engaged by the journal areas of the corresponding contact member, and means for holding the receptacle within the socket against rotation in either of two positions, in one of which positions the rotating axis of the rolling contact member is substantially parallel with the axis of the object, and in the other of which positions the rotating axis of the contact member is at right angles to the axis of said object.

21. A bearing according to claim 1, wherein the rolling contact member is other than spherical; and, in combination therewith, an object having a track engaged by the circumferential portion of the member intermediate its journal areas, said circumferential portion having a circular cross section normal to and concentric with the rotating axis of the contact member.

VINCENT E. PALUMBO.

REFERENCES CITED

The following references are of record in the file of this patent:

UNITED STATES PATENTS

| Number | Name | Date |
| --- | --- | --- |
| 560,281 | Rauhoff | May 19, 1896 |
| 685,922 | Lee | Nov. 5, 1901 |
| 1,184,343 | Guyer | May 23, 1916 |
| 1,521,871 | Deakin | Jan. 6, 1925 |

FOREIGN PATENTS

| Number | Country | Date |
| --- | --- | --- |
| 103,909 | Australia | July 7, 1937 |
| 501,193 | France | Apr. 6, 1920 |